US008950616B2

(12) United States Patent
Iwaya et al.

(10) Patent No.: US 8,950,616 B2
(45) Date of Patent: Feb. 10, 2015

(54) CLOSED FUEL TANK SYSTEM
(71) Applicant: Mitsubishi Jidosha Kogyo Kabushiki Kaisha, Tokyo (JP)
(72) Inventors: Norifumi Iwaya, Obu (JP); Kenichi Kunii, Okazaki (JP)
(73) Assignee: Mitsubishi Jidosha Kogyo Kabushiki Kaisha, Tokyo (JP)
( * ) Notice: Subject to any disclaimer, the term of this patent is extended or adjusted under 35 U.S.C. 154(b) by 0 days.
(21) Appl. No.: 14/137,553
(22) Filed: Dec. 20, 2013
(65) Prior Publication Data
US 2014/0175096 A1 Jun. 26, 2014
(30) Foreign Application Priority Data
Dec. 21, 2012 (JP) .................. 2012-279287
(51) Int. Cl.
*B60K 15/04* (2006.01)
*B60K 15/035* (2006.01)
*B60K 15/03* (2006.01)
(52) U.S. Cl.
CPC . B60K 15/03519 (2013.01); *B60K 2015/03576* (2013.01); *B60K 2015/03538* (2013.01); *B60K 2015/03296* (2013.01); *B60K 2015/03514* (2013.01)
USPC ........................................ 220/86.2; 123/520
(58) Field of Classification Search
USPC .......... 123/516, 518, 519, 520; 137/587, 588; 141/59, 95, 198; 220/86.1, 86.2, 89.1, 220/4.14, 203.19, 203.01
See application file for complete search history.

(56) References Cited

U.S. PATENT DOCUMENTS

| 6,276,193 | B1* | 8/2001 | Benjey ........................ 73/40.5 R |
| 6,276,387 | B1* | 8/2001 | Pachciarz et al. ................ 137/43 |
| 6,349,707 | B1* | 2/2002 | Neumann et al. ............. 123/520 |
| 6,354,280 | B1* | 3/2002 | Itakura et al. .................. 123/519 |
| 6,732,718 | B2* | 5/2004 | Kano et al. ..................... 123/518 |
| 6,772,740 | B2* | 8/2004 | Kojima et al. ................. 123/519 |
| 6,851,458 | B2* | 2/2005 | Nakajima et al. ............... 141/44 |
| 6,854,492 | B2* | 2/2005 | Benjey .......................... 141/198 |
| 7,320,315 | B2* | 1/2008 | Amano et al. ................. 123/520 |
| 7,363,803 | B2* | 4/2008 | Hayakawa et al. ............ 123/499 |
| 7,467,620 | B1* | 12/2008 | Reddy ........................... 123/520 |
| 8,511,285 | B2* | 8/2013 | Konohara et al. ............. 123/520 |
| 8,528,528 | B2* | 9/2013 | Fukui ............................ 123/520 |
| 8,616,047 | B2* | 12/2013 | Grunwald et al. ................. 73/47 |
| 8,739,767 | B2* | 6/2014 | Horiba et al. ................. 123/520 |
| 2004/0129259 | A1* | 7/2004 | Mitsutani ...................... 123/698 |
| 2010/0132676 | A1* | 6/2010 | Kitamura et al. ............. 123/520 |
| 2010/0192925 | A1* | 8/2010 | Sadakane ...................... 123/520 |
| 2012/0222657 | A1* | 9/2012 | Sano et al. .................... 123/520 |
| 2014/0116401 | A1* | 5/2014 | Horiba et al. ................. 123/520 |
| 2014/0116402 | A1* | 5/2014 | Horiba et al. ................. 123/520 |
| 2014/0144411 | A1* | 5/2014 | Iwaya et al. .................. 123/520 |

FOREIGN PATENT DOCUMENTS

JP      4638319 B2    2/2011

* cited by examiner

*Primary Examiner* — Steven A. Reynolds
*Assistant Examiner* — King M Chu
(74) *Attorney, Agent, or Firm* — Birch, Stewart, Kolasch & Birch, LLP

(57) ABSTRACT

A fuel tank system includes a tank that stores fuel, a leveling valve that decides a limit liquid surface, a filler pipe that is provided with a fuel filler opening to which a blocking cover is attached at an end portion of the filler pipe, a recirculation pipe that communicates with the filler pipe, a discharge passage that is connected to the leveling valve and branches to a first passage and a second passage, a seal valve, and a release valve that is connected to the tank at a position higher than the limit liquid surface and one of the recirculation pipe and the filer pipe, and is released by a pressure lower than a pressure caused by a head difference between the limit liquid surface and a liquid surface of the fuel at the fuel filler opening.

6 Claims, 5 Drawing Sheets

CLOSED FUEL TANK SYSTEM

CROSS REFERENCE TO RELATED APPLICATION

This application is based on Japanese Patent Application No. 2012-279287 filed on Dec. 21, 2012, the contents of which are incorporated herein by reference.

BACKGROUND OF THE INVENTION

1. Technical Field

The invention relates, in general, to a closed fuel tank system that tightly closes a fuel tank while an engine is being stopped and prevents vaporized fuel from being discharged into the atmosphere.

2. Background Art

Fuel vapor into which automotive fuel is vaporized contains a large quantity of hydrocarbon (HC). Since such hydrocarbon becomes a substance responsible for air pollution, the discharge of the hydrocarbon into the atmosphere has been regulated in recent years. When the fuel is injected into a fuel tank, the fuel vapor corresponding to a volume of the supplied fuel is discharged from the fuel tank. Further, when the fuel is injected through a fuel filler opening by a fuel filler nozzle, air is drawn into the fuel tank by a force with which the fuel enters, and then the fuel vapor of a volume corresponding to the air is further discharged.

An evaporated fuel discharge restraining device disclosed in Japanese Patent No. 4638319 is equipped with a first evaporated fuel passage connecting a fuel tank to a canister and a second evaporated fuel passage (recirculation pipe) connecting the fuel tank to a filler tube located adjacent to a fuel filler opening. The evaporated fuel discharge restraining device adsorbs evaporated fuel (fuel vapor) corresponding to a volume of supplied fuel to the canister. Further, since the evaporated fuel equal to or more than the volume of the supplied fuel is not generated, the evaporated fuel discharge restraining device disclosed in Japanese Patent No. 4638319 discharges the evaporated fuel to the filler tube adjacent to the fuel filler opening via the second evaporated fuel passage, and suctions the evaporated fuel into the fuel tank, and thereby restraining air from going from the fuel filler opening into the fuel tank.

Incidentally, the fuel vapor is generated in the fuel tank even when no fuel is supplied. When an engine is in operation, the fuel vapor is injected into an intake passage, and is burnt and consumed in the engine. Further, when the engine is not operated, the fuel vapor is adsorbed by the canister. The engine is operated, and thereby the fuel vapor adsorbed to the canister is extracted to the intake passage, and is burnt and consumed.

Accordingly, when the engine is operated for traveling, the fuel vapor is consumed at each time. In other words, when the engine is not in operation, the fuel vapor is not consumed. Especially, in the case of a plug-in hybrid electric vehicle (PHEV), an operating rate of the engine is extremely low. For this reason, simply adsorbing the fuel vapor to the canister cannot sufficiently process the fuel vapor. Further, in countries that severely control emission of harmful substances, a mechanism that does not discharge the fuel vapor is required. Taking these into consideration, in the case of the PHEV, it is considered to employ a closed fuel tank system in which a seal valve is installed on a path leading to the canister and the intake passage so as to prevent the fuel vapor from being discharged from the fuel tank.

When the fuel is supplied for the closed fuel tank system, the seal valve is opened, and the fuel vapor pushed out of the fuel tank is adsorbed by the canister. Further, in the closed fuel tank system, when the fuel tank is filled with the fuel to the maximum volume or is so-called "filled up," the fuel vapor should be prevented from being discharged from a filler pipe and a recirculation pipe. For this reason, when the fuel tank is filled up, ends of these pipes are provided to be kept immersed below a liquid surface of the fuel, i.e. to be submerged.

The seal valve employed in the closed fuel tank system is in a normally closed state, and is opened when the fuel is supplied. To determine that the fuel supply is performed, a lid covering a portion on which a fuel filler opening is installed is provided with a sensor cooperating with the lid. When an electronic control unit (ECU) detects that the lid is opened on the basis of a signal of the sensor, the ECU determines that the fuel supply is performed and opens the seal valve. When it is determined that the lid is closed, the ECU determines that the fuel supply is terminated and closes the seal valve.

Further, the fuel filler opening is mounted with a cap. When the cap is separated to supply the fuel, the lid is opened before that. That is, the seal valve is opened before the cap is separated. Even when a pressure in the fuel tank is higher than an atmospheric pressure by the fuel vapor, the seal valve is opened, and the fuel vapor is discharged to the canister. Thus, since the pressure in the fuel tank becomes the atmospheric pressure before the cap is separated, the fuel vapor is not discharged from the fuel filler opening. When the fuel supply is completed, the cap is attached to the fuel filler opening, and then the lid is closed. That is, the seal valve is closed after the cap is attached. Accordingly, the fuel vapor vaporized in the fuel tank is discharged to the canister through the seal valve until the cap is attached to the fuel filler opening.

However, due to a cause such as a failure, when the seal valve is closed before the cap is attached to the fuel filler opening, the fuel vapor is discharged from the fuel filler opening through the filler pipe and the recirculation pipe. Especially, in the fuel tank that has been filled up, since the filler pipe and the recirculation pipe are submerged in the fuel tank, when the seal valve is closed, the fuel vapor is kept sealed in the fuel tank.

Therefore, when the pressure in the fuel tank is raised due to the vaporization of the fuel, the fuel is pushed up to the fuel filler opening. The fuel has a smaller specific gravity than water, a head from the fuel tank to the fuel filler opening accounts for less than 1 meter. Hence, when the seal valve is left closed without the cap being mounted in the state in which the fuel tank is filled up, the fuel overflows from the fuel filler opening.

Accordingly, the present invention is intended to provide a closed fuel tank system in which, when the seal valve is left closed without the cap being mounted in the state in which the fuel tank is filled up, the fuel does not overflow from the fuel filler opening.

SUMMARY OF THE INVENTION (1) According to an aspect of the invention, a fuel tank system includes a tank that stores fuel, a leveling valve that decides a limit liquid surface which corresponds to a volume limit of the fuel stored in the tank, a filler pipe that extends from the tank at a position lower than the limit liquid surface and is provided with a fuel filler opening to which a blocking cover is attached at an end portion of the filler pipe, a recirculation pipe that extends from the tank at a position lower than the limit liquid surface and communicates with the filler pipe, a discharge passage that is connected to the leveling valve and branches to a first passage leading to a canister adsorbing fuel vapor and a second passage leading to an intake passage of an engine at a branch portion, a seal valve that is installed on the discharge passage between the leveling valve and the branch portion and seals up the tank, and a release valve one end of which is connected to the tank at a position higher than the limit liquid surface, the other end of which is connected to one of the recirculation pipe and the filer pipe, and is released by a pressure lower than a pressure caused by a head difference between the limit liquid surface and a liquid surface of the fuel at the fuel filler opening when the fuel up to the fuel filler opening to discharge the fuel vapor in the tank to at least one of the filler pipe and the recirculation pipe.

(2) In the configuration (1), the release valve is disposed inside the tank.

(3) In the configurations of (1) or (2), the release valve discharges the fuel vapor to the recirculation pipe.

(4) In the configuration of (1) or (2), the release valve discharges the fuel vapor in the tank to at least one of the filler pipe and the recirculation pipe at a position higher than a position which the fuel reaches by a release pressure of the release valve.

The fuel tank system according to the present invention is equipped with the release valve communicating with a portion above the limit liquid surface of the tank. The release valve is opened by a pressure lower than a pressure caused by a head difference between the limit liquid surface of the fuel FL in the tank and a liquid surface of the fuel FL at the fuel filler opening when the fuel is pushed up to the fuel filler opening, and discharges the fuel vapor in the tank to at least one of the filler pipe and the recirculation pipe. Accordingly, in a full state in which the tank is filled with the fuel to the limit liquid surface, and when the blocking cover is being detached, even when the seal valve is left closed, the fuel in the tank does not overflow from the fuel filler opening.

Further, according to the inventive fuel tank system in which the release valve is disposed inside the tank, in comparison with when the release valve is disposed outside the tank, a layout such as piping is simplified. As such, manufacturing cost of the fuel tank system is reduced, and workability when the fuel tank system is mounted on a vehicle is improved.

According to the inventive fuel tank system equipped with the release valve discharging the fuel vapor to the recirculation pipe, since the recirculation pipe is connected to the filler pipe located adjacent to the fuel filler opening, even when the fuel that has already entered the recirculation pipe is ejected when the fuel vapor is discharged, the fuel does not overflow from the fuel filler opening. Further, since the recirculation pipe has a smaller inner diameter than the filler pipe, a quantity of the ejected fuel is small.

Furthermore, according to the inventive fuel tank system in which the fuel vapor is discharged to at least one of the filler pipe and the recirculation pipe, which are higher than a position which the fuel reaches, by a pressure set to be opened, when the fuel vapor is discharged, the fuel does not spout out.

DESCRIPTION OF PREFERRED EMBODIMENT

Figure 1:
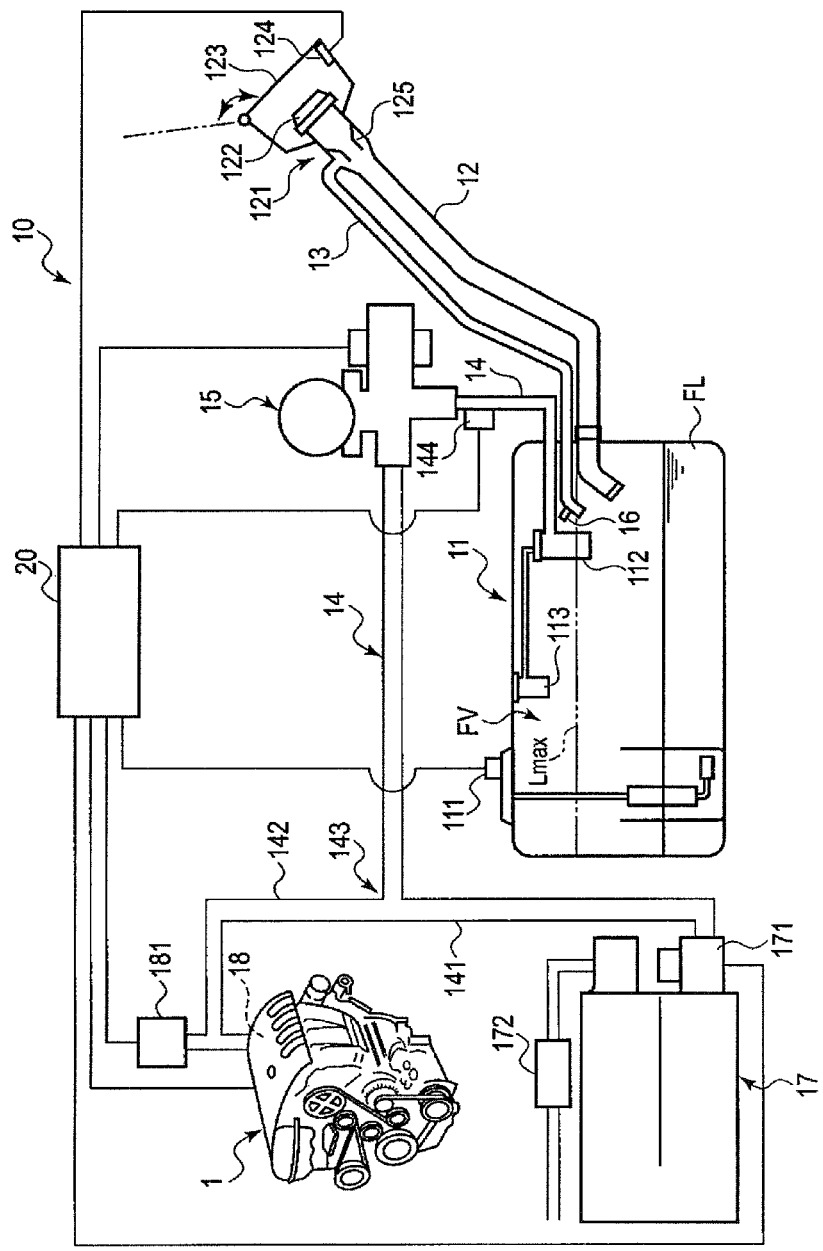
FIG. 1 is a configuration diagram showing a closed fuel tank system of a first embodiment according to the present invention.

A closed fuel tank system 10 of a first embodiment according to the present invention will be described with reference to FIGS. 1 to 4. The fuel tank system 10 shown in FIG. 1 is a so-called closed fuel tank system 10 in which, when an engine 1 is being stopped, fuel vapor FV generated in a tank 11 is sealed in the tank 11. Such a fuel tank system 10 is equipped with the tank 11, a leveling valve 112, a filler pipe 12, a recirculation pipe 13, discharge passage 14, a seal valve 15, and a release valve 16.

The tank 11 stores fuel FL and is equipped therein with a leveling valve 112 and a rollover valve 113 in addition to a pressure sensor 111 for measuring a pressure. The leveling valve 112 decides a limit liquid surface Lmax indicating a volume limit of the fuel FL stored in the tank 11. The filler pipe 12 extends from the interior of the tank 11 which is lower than the limit liquid surface Lmax of the tank 11, and has a fuel filler opening 121 in an end thereof outside the tank 11. A cap 122 serving as a blocking cover is attached to the fuel filler opening 121, and the fuel filler opening 121 is tightly closed. A lid 123 is attached to cover the fuel filler opening 121. The lid 123 is provided with a lid sensor 124 for detecting opening. Further, the fuel filler opening 121 is equipped with a guide 125 for guiding a fuel filler nozzle N shown in FIG. 3. Alternatively, instead of providing the lid sensor 124, output of a switch provided for a driver's seat in order to open the lid 123 may be used.

Figure 3:
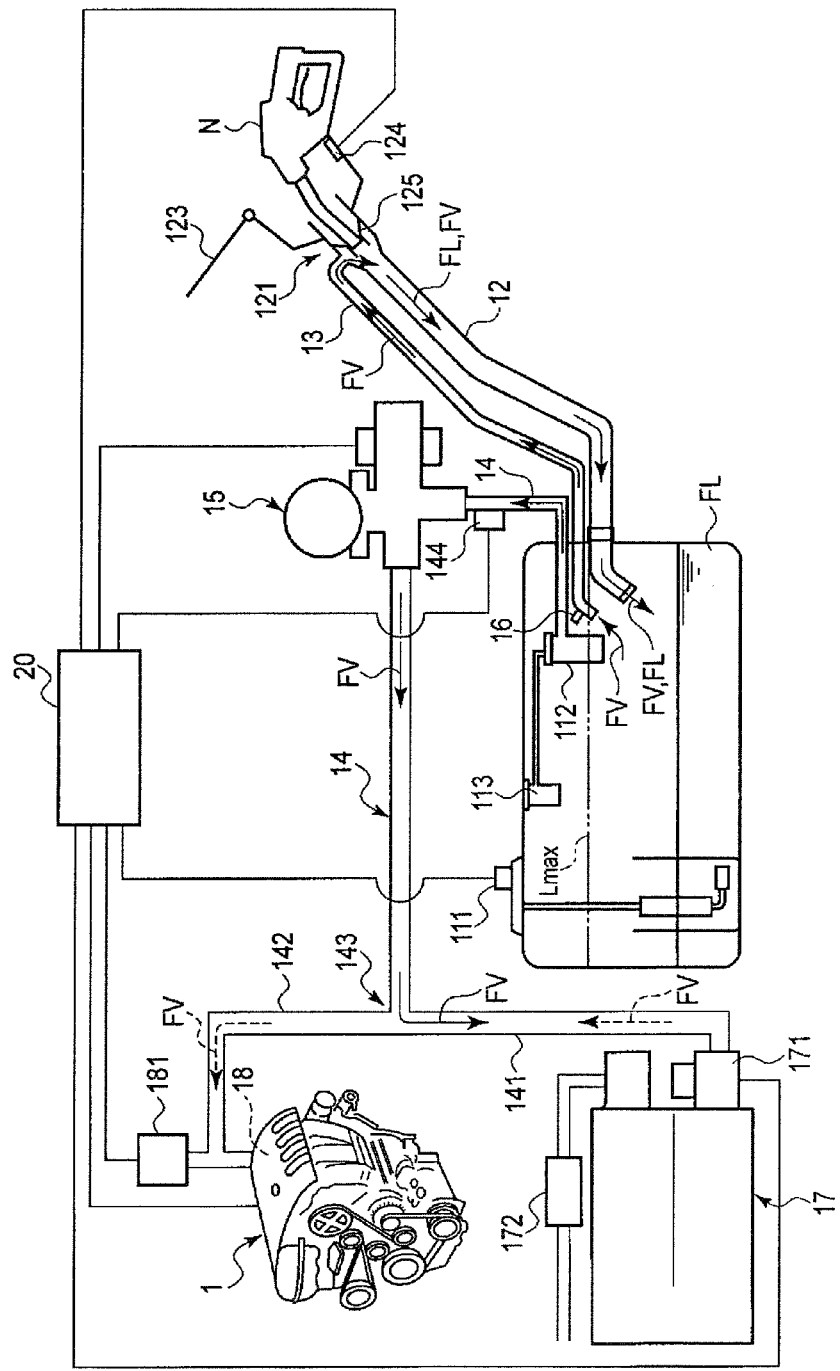
FIG. 3 is a diagram showing a process of supplying fuel in the fuel tank system of FIG. 1.

Further, as shown in FIG. 1, the recirculation pipe 13 extends from the from the interior of the tank 11 which is lower than the limit liquid surface Lmax of the tank 11 so as to be almost parallel with the filler pipe 12, and communicates with the filler pipe 12 adjacent to the fuel filler opening 121. As shown in FIG. 3, the recirculation pipe 13 returns the fuel vapor FV in the tank 11 to the vicinity of the fuel filler opening 121 so as to prevent external air from being suctioned from the fuel filler opening 121 when the fuel FL is being supplied through the filler pipe 12.

As shown in FIG. 1, the discharge passage 14 is connected to the leveling valve 112 inside the tank 11. The discharge passage 14 is divided into a first passage 141 and a second passage 142 by a branch 143. A tip of the first passage 141 is connected to a canister 17, which has an adsorbent capturing the fuel vapor FV, via a bypass solenoid valve 171. A tip of the second passage 142 is connected to an intake passage 18 of the engine 1 via a purge solenoid valve 181. The bypass solenoid valve 171 is opened when the fuel vapor FV discharged during fuel supply is being forcibly adsorbed and when the fuel vapor FV adsorbed to the canister 17 is being purged. The purge solenoid valve 181 is opened when the fuel vapor FV can be burnt and consumed on the basis of an air-fuel ratio when the engine 1 is in operation.

The seal valve 15 is installed on the discharge passage 14 from the tank 11 to the branch 143. The seal valve 15 is a solenoid valve opened when power is supplied. When the fuel FL is supplied to the tank 11, and when the fuel vapor FV collected in the tank 11 is burnt and consumed in the engine 1, the seal valve 15 is opened. In the other cases, the seal valve 15 is closed. A pressure sensor 144 is further installed on the discharge passage 14 between the seal valve 15 and the tank 11.

The release valve 16 is connected to a gaseous phase of the tank 11 in which the fuel FL is filled up to the volume limit, and is opened by a pressure lower than a head of the fuel FL up to the fuel filler opening 121. When the release valve 16 is opened, the fuel vapor FV in the tank 11 is discharged to at least one of the filler pipe 12 and the recirculation pipe 13.

Figure 2:
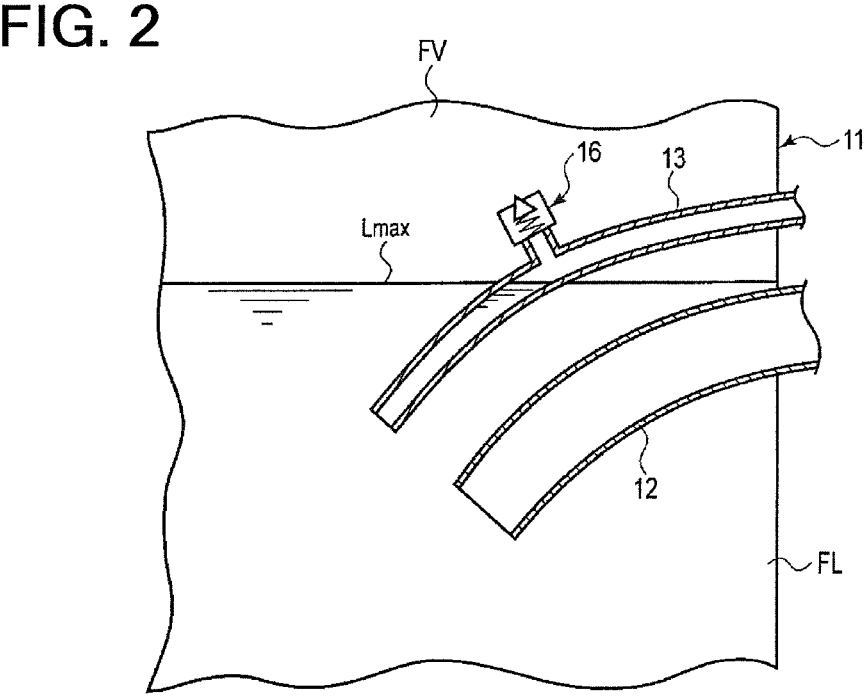
FIG. 2 is an enlarged diagram of the surroundings of a release valve in the fuel tank system of FIG. 1.
Figure 4:
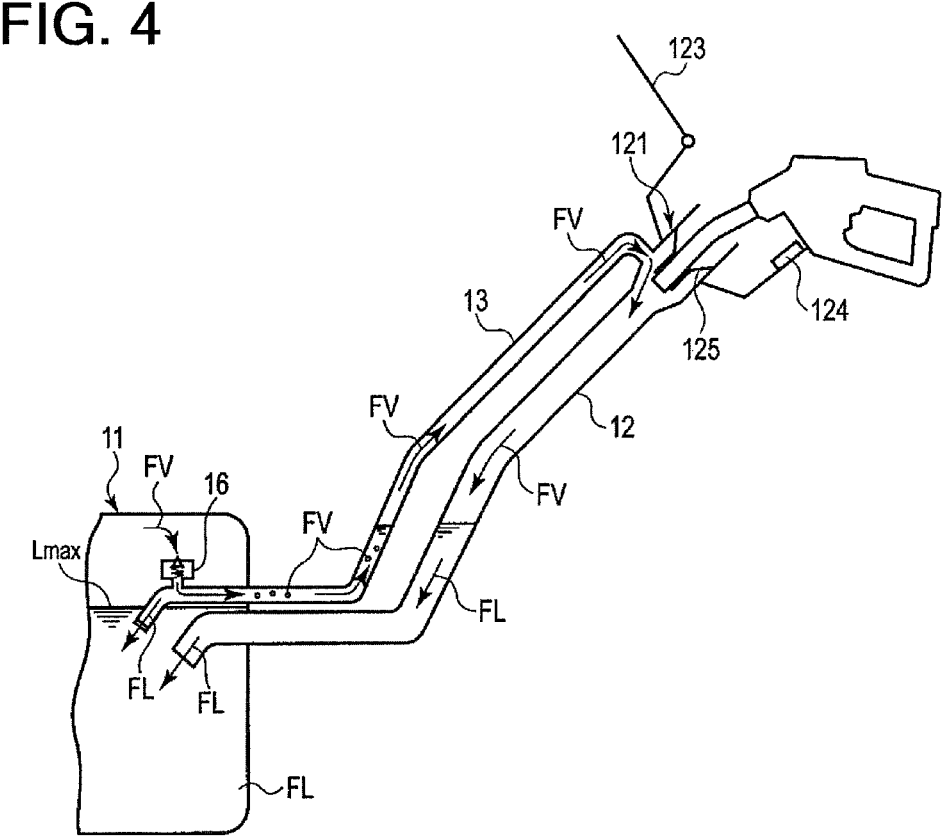
FIG. 4 is a diagram showing flows of fuel and fuel vapor when the release valve is operated in the fuel tank system of FIG. 1.

In the present embodiment, as shown in FIG. 2, the release valve 16 is disposed in the interior of the tank 11 which is higher than the limit liquid surface Lmax in the event of a so-called "full" state in which the tank 11 is filled with the fuel FL up to the volume limit, and is attached to the recirculation pipe 13 extending to the interior of the tank 11. As shown in FIG. 4, when the release valve 16 is opened, the fuel vapor FV in the tank 11 is sent to the side of the fuel filler opening 121 through the recirculation pipe 13.

Further, the pressure sensor 111, the lid sensor 124, the seal valve 15, the bypass solenoid valve 171, and the purge solenoid valve 181 are connected to an electronic control unit (ECU) 20 of a vehicle. The ECU 20 is also connected to the engine 1 and a vehicle speed sensor.

In the fuel tank system 10 configured as described above, flows of the fuel FL and the fuel vapor FV in the filler pipe 12 and the recirculation pipe 13 when the fuel FL is supplied are shown in FIG. 3.

First, a condition of each part when the fuel supply is performed will be described. When the lid 123 is opened to perform the fuel supply, the ECU 20 detects this by means of the lid sensor 124. When it is determined that the lid 123 is opened, the ECU 20 opens the seal valve 15 and the bypass solenoid valve 171. The fuel supply is initiated, after the cap 122 is detached and the fuel filler nozzle N is inserted into the fuel filler opening 121.

When the liquid surface of the fuel FL is being located below the filler pipe 12 and the recirculation pipe 13, as shown in FIG. 3, the fuel FL is supplied from the filler pipe 12, and the fuel vapor FV pushed out of the tank 11 is sent up to the vicinity of the fuel filler opening 121 through the recirculation pipe 13. The fuel vapor FV is sent to the tank 11 again along with the fuel FL supplied from the fuel filler nozzle N. Thereby, the external air is inhibited from entering the tank. The fuel vapor FV discharged by a rise in the liquid surface of the fuel FL in the tank 11 is sent and adsorbed to the canister 17 via the discharge passage 14 on which the seal valve 15 is opened.

When the fuel FL becomes the so-called "full" state in which the fuel is filled up to the limit liquid surface Lmax that corresponds to the volume limit of the tank 11, as shown in FIG. 2, ends of the filler pipe 12 and the recirculation pipe 13 inside the tank 11 becomes a so-called "submerged" state in which they are immersed to a position lower than the limit liquid surface Lmax of the fuel FL. As the filler pipe 12 and the recirculation pipe 13 are submerged, flow resistance is sharply changed. As such, the supplied fuel FL fills the filler pipe 12. The fuel filler nozzle N detects that the tank 11 is filled up by means of a sensor of a tip thereof, and the supply of the fuel FL is stopped.

The filler pipe 12 and the recirculation pipe 13 are submerged, and the seal valve 15 is opened. As such, the fuel vapor FV generated in the tank 11 does not rise to the fuel filler opening 121 during separating the fuel filler nozzle N from the fuel filler opening 121 and attaching the cap 122. After the cap 122 is attached, the lid 123 is closed. When it is detected by the lid sensor 124 that the lid 123 is closed, the ECU 20 determines that the fuel supply is completed, and closes the seal valve 15 and the bypass solenoid valve 171.

Further, the ECU 20 detects a liquid pressure of the fuel FL by means of the pressure sensor 111, and determines that the tank is filled up.

The fuel FL is always evaporated to become the fuel vapor FV and increases an internal pressure of the tank 11. When the internal pressure of the tank 11 rises above a prescribed value, this is detected by the pressure sensor 144. When the engine 1 is operated, the ECU 20 is operated to cause the fuel vapor FV to be burnt and consumed in the engine 1 to lower the internal pressure of the tank 11. The ECU opens the seal valve 15 with the bypass solenoid valve 171 closed, and checks a timing on the basis of the air-fuel ration of the engine 1 to open the purge solenoid valve 181. The fuel vapor FV is introduced from the intake passage 18 of the engine 1, and is burnt and consumed in the engine 1.

When the engine 1 is not operated, and when it is detected that a detected value of the pressure sensor 144 exceeds the prescribed value, the ECU 20 may open the seal valve 15 and the bypass solenoid valve 171, and cause the fuel vapor FV to be adsorbed to the canister 17. Further, the ECU 20 performs control to force the fuel vapor FV to be purged from the canister 17 while the engine 1 is in operation on the basis of an accumulated time for which the fuel vapor FV is forcibly adsorbed to the canister 17. When the fuel vapor FV is forcibly purged from the canister 17, the ECU 20 closes the seal valve 15 and opens the bypass solenoid valve 171. The ECU 20 checks the timing on the basis of the air-fuel ratio of the operated engine 1 to open the purge solenoid valve 181. The fuel vapor FV captured to the canister 17 is expelled from the canister 17 by the external air introduced from the opposite side of the canister with respect to the bypass solenoid valve 171 to the canister via a filter 172, and is sent from the first passage 141 to the intake passage 18 of the engine 1 via the second passage 142 as indicated in FIG. 3 with an arrow of a broken line.

This closed fuel tank system 10 includes the release valve 16. The release valve 16 is released by a pressure lower than a pressure caused by a head difference between the limit liquid surface Lmax of the FL in the tank 11 and a liquid surface of the fuel FL at the fuel filler opening 121 when the fuel FL is pushed up to the fuel filler opening 121. The release valve 16 produces an effect during the fuel supply during which the cap 122 is detached, and when there occurs a situation in which the seal valve 15 is closed after the tank 11 is filled up. What is assumed as the situation in which the seal valve 15 is closed when the cap 122 is detached, and when the tank 11 is filled up includes (1) when the vehicle is left in a complete state of an automatic supply of the fuel FL, and a continuous open time set for the seal valve 15 is exceeded, (2) when the lid 123 is closed without mounting the cap 122, and (3) when the supply of power to the seal valve 15 is interrupted.

In any case, when the seal valve 15 is closed, the fuel vapor FV is generated, and the internal pressure of the tank 11 rises to push up the fuel FL in the submerged filler pipe 12 and the recirculation pipe 13. In this case, since the release valve 16 is released by a pressure lower than a pressure caused by a head difference between the limit liquid surface Lmax of the fuel FL in the tank 11 and a liquid surface of the fuel FL at the fuel filler opening 121 when the fuel FL is pushed up to the fuel filler opening 121, the fuel vapor FV in the tank 11 is discharged to the recirculation pipe 13 before the fuel FL reaches the fuel filler opening 121. The discharged fuel vapor FV flows to the side of the fuel filler opening 121. Thereby, the pressure in the tank 11 is lowered, and the pushed fuel FL is also returned back to the tank 11. Accordingly, the fuel FL does not leak from the fuel filler opening.

Meanwhile, in any one of a situation in which the lid sensor 124 detects that the lid 123 is in an opened state, a situation in which the pressure sensor 111 detects that the fuel FL is filled up, and a situation in which it is detected that a given time has lapsed after it is detected that the fuel FL is filled up, when it is detected that the seal valve 15 is closed, or that the supply of power is interrupted, the ECU 20 may notify a warning.

Figure 5:
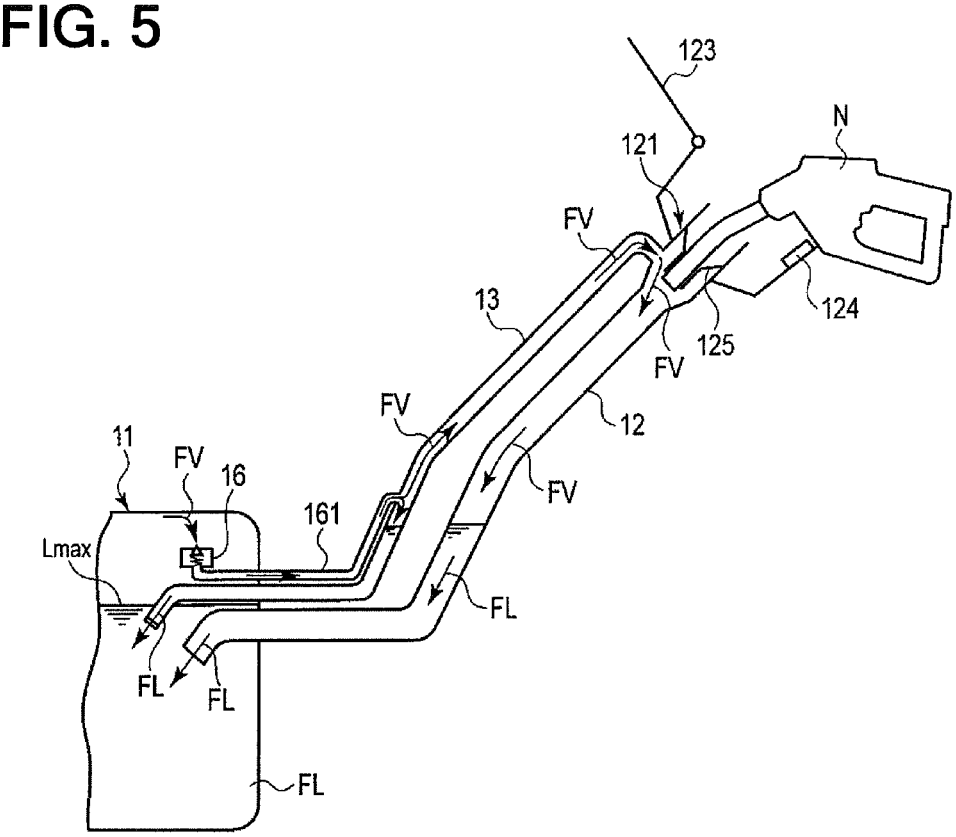
FIG. 5 is a configuration diagram showing flows of fuel and fuel vapor when a release valve is operated in a closed fuel tank system of a second embodiment according to the present invention.

A fuel tank system 10 of a second embodiment according to the present invention will be described with reference to FIG. 5. Components having the same function as the fuel tank system 10 of the first embodiment are given the same numerals in the figure, and detailed description thereof is explained by the description in the first embodiment.

In the fuel tank system 10 of the second embodiment, a release valve 16 is different from the release valve 16 of the fuel tank system 10 of the first embodiment. The release valve 16 is connected to at least one of a filler pipe 12 and a recirculation pipe 13 at a height higher than a position which fuel FL reaches by a release pressure of the release valve 16, and discharges fuel vapor FV in a tank 11. In detail, as shown in FIG. 5, the release valve 16 is disposed in a gaseous phase in the tank 11 which is located above the limit liquid surface Lmax, and a high-pressure side thereof is exposed to the gaseous phase. A low-pressure side of the release valve 16 is connected to the recirculation pipe 13 at the height higher than the position which fuel FL reaches by the release pressure of the release valve 16, via a discharge pipe 161. As shown in FIG. 5, the connected position is located outside the tank 11.

According to the fuel tank system 10 configured as described above, in the state in which the cap 122 is detached from the fuel filler opening 121, and when the tank 11 is filled up, even when the seal valve 15 is closed, the fuel vapor FV is discharged to the recirculation pipe 13 at the height higher than a position at which the fuel FL is pushed up by a pressure at which the release valve 16 is set to be released. In other words, the liquid surface of the fuel FL in the recirculation pipe 13 communicates with the fuel filler opening 121 opened to the air and does not also arrive to the position at which the fuel FL is pushed up by the pressure at which the release valve 16 is set to be released. As such, the fuel vapor FV is discharged to the recirculation pipe 13 with low resistance. Since the pressure in the tank 11 is lowered, the fuel FL pushed up in the recirculation pipe 13 returns to the tank 11. Further, since the recirculation pipe 13 communicates with the filler pipe 12 in the vicinity of the fuel filler opening 121, the fuel FL pushed up in the filler pipe 12 returns to the tank 11. A direction in which the discharged fuel vapor FV flows is turned to the filler pipe 12 by the guide 125 installed in the fuel filler opening 121, the liquid surface in the filler pipe 12 is lowered, and the fuel vapor FV is drawn into the filler pipe 12. Accordingly, a quantity of the fuel vapor FV discharged from the fuel filler opening 121 can be suppressed.

What is claimed is:

1. A fuel tank system comprising:
a tank that stores fuel;
a leveling valve that decides a limit liquid surface which corresponds to a volume limit of the fuel stored in the tank;
a filler pipe that extends from the tank at a position lower than the limit liquid surface and is provided with a fuel filler opening to which a blocking cover is attached at an end portion of the filler pipe;
a recirculation pipe that extends from the tank at a position lower than the limit liquid surface and communicates with the filler pipe;
a discharge passage that is connected to the leveling valve and branches to a first passage leading to a canister adsorbing fuel vapor and a second passage leading to an intake passage of an engine at a branch portion;
a seal valve that is installed on the discharge passage between the leveling valve and the branch portion and seals up the tank; and
a release valve one end of which is connected to the tank at a position higher than the limit liquid surface, the other end of which is connected to one of the recirculation pipe and the filer pipe, and is released by a pressure lower than a pressure caused by a head difference between the limit liquid surface and a liquid surface of the fuel at the fuel filler opening when the fuel up to the fuel filler opening to discharge the fuel vapor in the tank to at least one of the filler pipe and the recirculation pipe.

2. The fuel tank system according to claim 1, wherein the release valve is disposed inside the tank.

3. The fuel tank system according to claim 1, wherein the release valve discharges the fuel vapor to the recirculation pipe.

4. The fuel tank system according to claim 2, wherein the release valve discharges the fuel vapor to the recirculation pipe.

5. The fuel tank system according to claim 1, wherein the release valve discharges the fuel vapor in the tank to at least one of the filler pipe and the recirculation pipe at a position higher than a position which the fuel reaches by a release pressure of the release valve.

6. The fuel tank system according to claim 2, wherein the release valve discharges the fuel vapor in the tank to at least one of the filler pipe and the recirculation pipe at a position higher than a position which the fuel reaches by a release pressure of the release valve.

* * * * *